US009718461B2

(12) United States Patent
Nishimine (10) Patent No.: US 9,718,461 B2
(45) Date of Patent: Aug. 1, 2017

(54) CONTROL SYSTEM FOR HYBRID VEHICLE

(71) Applicant: TOYOTA JIDOSHA KABUSHIKI KAISHA, Toyota-shi (JP)

(72) Inventor: Akiko Nishimine, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/055,845

(22) Filed: Feb. 29, 2016

(65) Prior Publication Data

US 2016/0280215 A1 Sep. 29, 2016

(30) Foreign Application Priority Data

Mar. 24, 2015 (JP) ................. 2015-060479

(51) Int. Cl.
| | |
|---|---|
| B60W 20/00 | (2016.01) |
| B60W 10/00 | (2006.01) |
| B60K 6/00 | (2006.01) |
| B60L 11/00 | (2006.01) |
| B60W 20/20 | (2016.01) |
| B60W 10/06 | (2006.01) |
| B60W 10/08 | (2006.01) |
| B60W 10/30 | (2006.01) |
| B60K 6/365 | (2007.10) |
| B60K 6/48 | (2007.10) |

(52) U.S. Cl.
CPC ............ *B60W 20/20* (2013.01); *B60K 6/365* (2013.01); *B60K 6/48* (2013.01); *B60W 10/06* (2013.01); *B60W 10/08* (2013.01); *B60W 10/30* (2013.01); *B60W 2510/107* (2013.01); *B60Y 2200/92* (2013.01); *Y02T 10/6221* (2013.01); *Y02T 10/6286* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,806,796 | B2 * | 10/2010 | Zhu .......................... | B60K 6/48 475/73 |
| 2010/0256849 | A1 * | 10/2010 | Akimoto ................ | B60K 6/445 701/22 |
| 2013/0305878 | A1 | 11/2013 | Seno et al. | |

(Continued)

FOREIGN PATENT DOCUMENTS

| | | |
|---|---|---|
| JP | 2008-265600 | 11/2008 |
| JP | 2012-163146 | 8/2012 |

*Primary Examiner* — Yonel Beaulieu
(74) *Attorney, Agent, or Firm* — Oblon, McClelland, Maier & Neustadt, L.L.P.

(57) ABSTRACT

A control system for hybrid vehicles that ensures high motor power while limiting damage on a planetary gear unit is provided. In a planetary gear unit, a sun gear is connected to a first motor, a ring gear is connected to a second motor, and a carrier is connected to an engine. An operating mode of the hybrid vehicle can be selected from a hybrid mode, a single-motor mode, and a dual-motor mode. The control system is configured to shift the operating mode to the hybrid mode if an estimated temperature of the pinion gear is higher than a threshold temperature, and to the single-motor mode if the estimated temperature of the pinion gear is lower than a threshold temperature.

5 Claims, 5 Drawing Sheets

(56) References Cited

U.S. PATENT DOCUMENTS

2016/0101771 A1\* 4/2016 Hata .................. B60K 6/445
 701/22
2016/0207519 A1\* 7/2016 Hata .................. B60W 20/10
2016/0297444 A1\* 10/2016 Endo ................ B60W 30/1843

\* cited by examiner

CONTROL SYSTEM FOR HYBRID VEHICLE

The present invention claims the benefit of Japanese Patent Application No. 2015-060479 filed on Mar. 24, 2015 with the Japanese Patent Office, the disclosures of which are incorporated herein by reference in its entirety.

BACKGROUND

Field of the Invention

Embodiments of the present application relates to the art of a control system for a hybrid vehicle in which powers of an engine and a motor are delivered to a drive shaft through a planetary gear unit.

Discussion of the Related Art

JP-A-2008-265600 describes a hybrid vehicle in which a prime mover includes a first motor, a second motor and an engine. In the hybrid vehicle taught by JP-A-2008-265600, a planetary gear unit is disposed between the prime mover and a drive shaft to distribute and synthesize torque(s). In the planetary gear unit, a sun gear is connected to the first motor, a ring gear is connected to the second motor, and a carrier is connected to the engine. Rotation of the carrier thus connected to the engine is halted by a clutch. According to the teachings of JP-A-2008-265600, a torque distribution ratio for operating the motors is determined in an energy efficient manner, and the vehicle is powered by the motors while stopping the engine and bringing the clutch into engagement.

JP-A-2012-163146 describes a vehicle drive device including oil feeding structure to a planetary gear unit. According to the teachings of JP-A-2012-163146, the oil thrown up by rotation of gears forming is collected by a catch tank, and the oil in the catch tank is caused by the gravitational force to fall down from a collected oil falling passage to be supplied into the inside housing space.

According to the teachings of JP-A-2008-265600, the hybrid vehicle can be powered by the first motor and the second motor in an energy efficient manner while halting a rotation of the carrier connected to the engine. In such dual motor mode, as indicated in the nomographic diagram shown in FIG. 9 of JP-A-2008-265600, a rotational speed of the carrier connected to the engine is fixed to 0 by bringing the brake into engagement. In this situation, output power of the motors can be increased by rotating the first motor in an opposite direction to a rotational direction of the second motor.

In the above explained dual motor mode, pinion gears of the planetary gear unit are rotated at high speed while being subjected to the output torque of the first motor. In addition, since the engine is stopped under the dual motor mode, oil supply to the pinion gears from a mechanical oil pump driven by the engine is stopped. For these reasons, temperature of the pinion gears may be raised excessively to cause seizure and wear. However, in the hybrid vehicle taught by JP-A-2012-163146, the pinion gears thus rotated at high speed in the dual motor mode cannot be cooled and lubricated. Even if the lubrication system taught by JP-A-2008-265600 is employed in the hybrid vehicle taught by JP-A-2012-163146, the pinion gears may not be lubricated sufficiently when rotated at high speed and consequently the planetary gear unit may be damaged.

Such seizure and wear of the pinion gears may be prevented by propelling the vehicle only by the second motor instead of propelling the vehicle by both motors while halting the carrier. However, an output range of the motors has to be restricted and hence driving performance of the hybrid vehicle may be limited.

SUMMARY

Aspects of embodiments of the present invention have been conceived noting the foregoing technical problems, and it is therefore an object of embodiments of the present invention is to provide a control system for hybrid vehicles that ensures high motor power to improve driving performance in a motor running mode while limiting damage on a planetary gear unit.

The control system is applied to a hybrid vehicle comprising: a prime mover including an engine, a first motor, and a second motor; a planetary gear unit, in which a sun gear is connected to the first motor, a ring gear is connected to the second motor, and a carrier is connected to the engine, in which a driveshaft is connected to the sun gear or the ring gear, and in which a rotation of the carrier is selectively halted by a brake; and a mechanical oil pump that is driven by the engine to deliver oil to the planetary gear unit, An operating mode of the hybrid vehicle thus structured may be selected from a hybrid mode in which the hybrid vehicle is powered at least by the engine, a first electric vehicle mode in which the hybrid vehicle is powered by the second motor, and a second electric vehicle mode in which the hybrid vehicle is powered by the first motor and the second motor while halting rotation of the carrier by the brake. In order to achieve the above-explained objective, according to the present application, controller of the control system is configured: to estimate a temperature of a pinion gear of the planetary gear unit; to determine an availability of the second electric vehicle mode; to inhibit the second electric vehicle mode if the second electric vehicle mode is unavailable; and to shift the operating mode to the hybrid mode if the estimated temperature of the pinion gear is higher than a threshold temperature, and to the first electric vehicle mode if the estimated temperature of the pinion gear is lower than a threshold temperature.

In a non-limiting embodiment, the control system is provided with an oil feeding device that is driven by a power other than engine power to deliver the oil to the planetary gear unit. In addition, the controller is further configured to estimate an oil feeding amount to the planetary gear unit from the oil feeding device, and to determine a fact that the second electric vehicle mode is unavailable if the estimated oil feeding amount is smaller than a predetermined amount.

In a non-limiting embodiment, the oil feeding device may include an electric oil pump driven by another motor other than the prime mover to deliver oil to the planetary gear unit. In addition, the controller is further configured to determine an operability of the electric oil pump, and to determine a fact that the second electric vehicle mode is unavailable if the electric oil pump cannot be operated properly.

In a non-limiting embodiment, the controller may be further configured to cancel inhibition of the second electric vehicle mode when duration of the hybrid mode exceed a first threshold period.

In a non-limiting embodiment, the controller may be further configured to cancel inhibition of the second electric vehicle mode when duration of activation of the electric oil pump reaches a second threshold period.

Thus, in the hybrid vehicle, the second electric vehicle mode in which the vehicle is powered by the first and the second motors is inhibited if the controller determines a fact that the second electric vehicle mode is unavailable. Under the second electric vehicle mode, a load on the planetary gear unit is increased and hence the pinion gears are rotated at a high speed. Consequently, temperature of the pinion gears may be raised excessively to cause seizure and wear of the pinion gears. According to the non-limiting embodiment, therefore, the second electric vehicle mode is inhibited if the temperature of the pinion gear is higher than the threshold temperature, or if the oil cannot be delivered properly to the planetary gear unit. During inhibition of the second electric vehicle mode, the operating mode of the vehicle is shifted to the first electric vehicle mode if the estimated temperature of the pinion gear is lower than the threshold temperature. For this reason, the electric vehicle mode can be continued without causing seizure and wear of the planetary gear unit. By contrast, if the estimated temperature of the pinion gear is higher than the threshold temperature, the operating mode is shifted to the hybrid mode even if a required driving force can be achieved only by the second motor. In this case, therefore, the planetary gear unit can be cooled and lubricated effectively by the oil discharged from the mechanical oil pump driven by the engine.

According to the non-limiting embodiment, the oil feeding amount to the planetary gear unit from the oil feeding device may be estimated based on an oil temperature and a vehicle speed. For example, if an oil temperature is low, viscosity of the oil is increased and hence the oil may not be delivered sufficiently to the planetary gear unit. Likewise, if the vehicle speed is low, the oil may not be delivered sufficiently to the planetary gear unit. According to the non-limiting embodiment, therefore, availability of the second electric vehicle mode may be determined easily based on the estimated oil feeding amount to the planetary gear unit.

According to the non-limiting embodiment, the availability of the second electric vehicle mode may also be determined based on the operability of the electric oil pump. To this end, the operability of the electric oil pump may be determined based on an oil temperature. For example, if the oil temperature is low and hence viscosity of the oil is high, the electric oil pump may not be operated properly due to shortage of power. Likewise, if some sort of failure occurs on the electric oil pump, the electric oil pump may not be operated properly. According to the non-limiting embodiment, therefore, availability of the second electric vehicle mode may be determined easily based on the operability of the electric oil pump.

According to the non-limiting embodiment, the planetary gear unit may be cooled and lubricated effectively by the oil discharged from the mechanical oil pump during propulsion under the hybrid mode. According to the non-limiting embodiment, therefore, the planetary gear unit may be cooled and lubricated effectively during the first threshold period, and then the inhibition of the second electric vehicle mode is cancelled. For this reason, the planetary gear unit may be cooled sufficiently to limit damage thereon, and an available time and a cruising distance of the second electric vehicle mode may be extended.

According to the non-limiting embodiment, the planetary gear unit may be cooled and lubricated effectively by operating the electric oil pump properly. According to the non-limiting embodiment, therefore, the planetary gear unit may be cooled and lubricated effectively during the second threshold period, and then the inhibition of the second electric vehicle mode is cancelled. For this reason, the planetary gear unit may be cooled sufficiently to limit damage thereon, and an available time and a cruising distance of the second electric vehicle mode may be extended.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
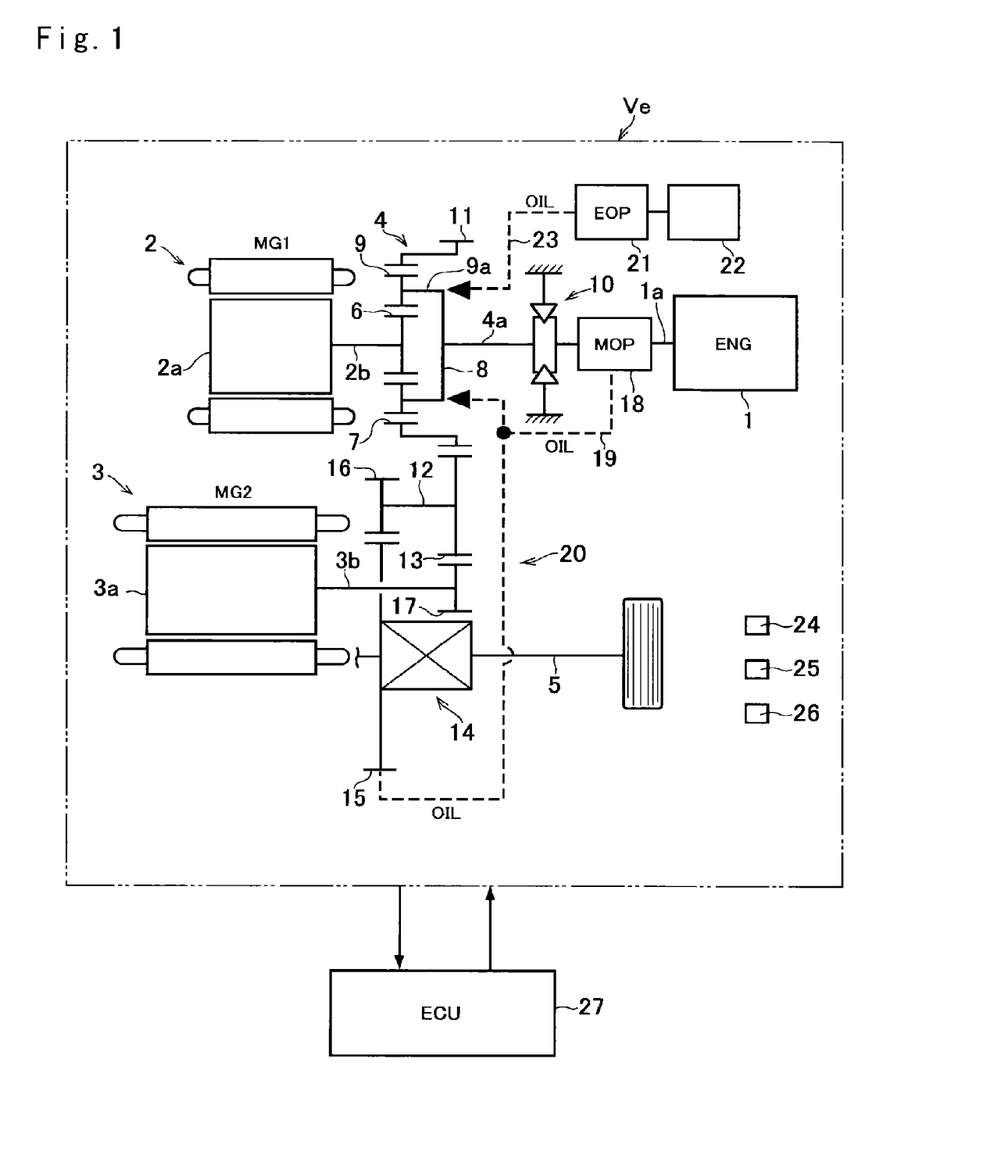
FIG. 1 is a schematic illustration showing one example of the hybrid vehicle to which the control system according to the preferred example is applied.

Preferred examples of the present application will now be explained with reference to the accompanying drawings. Referring now to FIG. 1, there is shown one example of the hybrid vehicle to which the control system according to the present application is applied. In the vehicle Ve a prime mover includes an engine 1 (referred to as "ENG" in FIG. 1), a first motor 2 (referred to as "MG1" in FIG. 1), and a second motor 3 (referred to as "MG2" in FIG. 1). A power of the engine 1 is distributed to the first motor 2 side and to a driveshaft 5 side through a planetary gear unit 4. Meanwhile, an electric power generated by the first motor 2 is supplied to the second motor 3 so that the second motor 3 is driven to generate a power for assisting driving force to rotate the driveshaft 5.

The engine 1 is started and stopped electrically, and output power thereof is also adjusted electrically. Specifically, given that a gasoline engine is used as the engine 1, an opening degree of a throttle valve, an amount of fuel supply, a commencement and a termination of ignition, an ignition timing etc. are controlled electrically.

In the vehicle Ve, a permanent magnet type synchronous motor having a generating function is used individually as the first motor 2 and the second motor 3. Each of the first motor 2 and the second motor 3 is individually connected with a battery (not shown) through an inverter (not shown) to control a rotational speed and a torque thereof so that the motors 2 and 3 can be operated selectively as a motor and a generator.

Specifically, the planetary gear unit 4 as a power distribution device is a single-pinion planetary gear unit adapted to perform a differential action among three rotary element such as a sun gear 6, a ring gear 7 and a carrier 8.

The planetary gear unit 4 is arranged coaxially with an output shaft 1a of the engine 1, and the first motor 2 is situated on an opposite side of the engine 1 across the planetary gear unit 4. The sun gear 6 of the planetary gear unit 4 is connected to a rotor shaft 2b rotated integrally with a rotor 2a of the first motor 2, and the ring gear 7 as an internal gear is situated concentrically with the sun gear 6. A plurality of pinion gears 9 are interposed between the sun gear 6 and the ring gear 7 while meshing with those gears, and the pinion gears 9 are supported by the carrier 8 connected to an input shaft 4a of the planetary gear unit 4 in a rotatable and revolvable manner. The input shaft 4a is also connected to the output shaft 1a of the engine 1 through a one-way clutch 10.

The one-way clutch 10 comprises a rotary member connected to the output shaft 1a of the engine 1 and the carrier 8, and a stationary member fixed to a housing. In the one-way clutch 10, the rotary member is allowed to rotate freely in a rotational direction of the engine 1, but the rotary member is brought into engagement with the stationary member when rotated in the opposite direction to halt a counter rotation of the output shaft 1a and the carrier 8. That is, the one-way clutch 10 serves as a brake device to halt rotation of the output shaft 1a of the engine 1 when propelling the vehicle Ve by output torques of the first motor 2 and the second motor 3. To this end, a friction brake or the like may also be used instead of the one-way clutch 10.

A drive gear 11 is an external gear that is formed around the ring gear 7 of the planetary gear unit 4 integrally therewith, and a countershaft 12 is arranged in parallel with a common rotational axis of the planetary gear unit 4 and the first motor 2. A counter driven gear 13 is fitted onto one of the end portions of the countershaft 12 (i.e., right side in FIG. 1) in such a manner to be rotated therewith while being meshed with the drive gear 11. A counter drive gear 16 is fitted onto the other end portion of the countershaft 12 (i.e., left side in FIG. 1) in such a manner to be rotated therewith while being meshed with a ring gear 15 of a deferential gear unit 14 as a final reduction. Thus, the ring gear 7 of the planetary gear unit 4 is connected to the driveshaft 5 through the drive gear 11, the countershaft 12, the counter driven gear 13, the counter drive gear 16, and the deferential gear unit 14.

Torque of the second motor 3 can be added to torque transmitted from the planetary gear unit 4 to the driveshaft 5. To this end, the second motor 3 is arranged in parallel with the countershaft 12, and a reduction gear 17 connected to a rotor shaft 3b rotated integrally with a rotor 3a is meshed with the counter driven gear 13. That is, the ring gear 7 of the planetary gear unit 4 is connected to the driveshaft 5 and the second motor 3 through the aforementioned gear train or the reduction gear 17.

Thus, in the vehicle Ve, the output shaft 1a of the engine 1 and the rotor shaft 2b of the first motor 2 are connected to the gear train of the driveshaft 5 side and the deferential gear unit 14 through the planetary gear unit 4. That is, the output torques of the engine 1 and the first motor 2 are delivered to the driveshaft 5 through the planetary gear unit 4.

In order to cool and lubricate the planetary gear unit 4, the vehicle Ve is provided with a mechanical oil pump (to be abbreviated as the "MOP" hereinafter) 18 driven by torque of the engine 1. Specifically, a rotor (not shown) of the MOP 18 is rotated by a rotation of the output shaft 1a of the engine 1 to establish hydraulic pressure during operation of the engine 1.

The oil discharged from the MOP 18 is delivered to the planetary gear unit 4 through an oil passage 19. In addition, the oil splashed by the ring gear 15 of the differential gear unit 14 as a part of a splash lubrication device 20 is also applied to the planetary gear unit 4.

Specifically, in the splash lubrication device 20, teeth of the ring gear 15 is immersed in the oil in an oil pan (not shown) so that the oil is splashed by the ring gear 15 rotated by a torque of the driveshaft 5 to be applied to the planetary gear unit 4. That is, the planetary gear unit 4 may be lubricated as long as the driveshaft 5 is rotated during propulsion of the vehicle Ve even if the output shaft 1a of the engine 1 is not rotated.

As described, the MOP 18 cannot establish hydraulic pressure during cessation of engine operation, but the oil still can be applied to the planetary gear unit 4 from the splash lubrication device 20 if the vehicle Ve is running. However, lubricating or cooling performance of the splash lubrication device 20 adapted to deliver oil to the planetary gear unit 4 utilizing gravitational force is not comparable to that of a forced lubrication device adapted to discharge pressurized oil. In addition, the lubricating or cooling performance of the splash lubrication device 20 may be affected by a temperature and a vehicle speed. For example, if an oil temperature is low, viscosity of the oil is increased and hence the oil may not be delivered sufficiently to the planetary gear unit 4 by the splash lubrication device 20. Likewise, if the vehicle speed is low, the ring gear 15 is rotated at a low speed and hence the oil may not be delivered sufficiently to the planetary gear unit 4. By contrast, if the oil temperature is high and oil viscosity is low, and if a rotational speed of the pinion gear 9 is high, the oil may also be splashed by the pinion gears 9 without adhering thereto and hence the planetary gear unit 4 may not be lubricated sufficiently.

In order to ensure oil delivery to the planetary gear unit 4 even when the engine 1 is stopping or even when the splash lubrication device 20 is not in condition to achieve the required performance, the vehicle Ve is provided with an electric oil pump (to be abbreviated as the "EOP" hereinafter) 21 driven by a torque of a pump motor 22 connected thereto. Thus, the pump motor 22 is arranged in the vehicle Ve to establish hydraulic pressure by the EOP 21, in addition to the first motor 2 and the second motor 3.

The oil discharged from the EOP 21 is also delivered to the planetary gear unit 4 through an oil passage 23. According to the embodiment shown in FIG. 1, the oil passage 23 is formed independently to provide a connection between the EOP 21 and the planetary gear unit 4. However, the oil passage 23 may be joined partially to the oil passage 19.

The vehicle Ve is provided with a vehicle speed sensor 24. As described later, an oil feeding amount to the planetary gear unit 4 from the splash lubrication device 20 and the mechanical oil pump may be estimated based on a vehicle speed detected by the vehicle speed sensor 24.

In addition, an oil temperature sensor 25 is arranged in the vehicle Ve to detect temperature of the oil discharged from the MOP 18 and the EOP 21. According to the preferred embodiment, the oil temperature sensor 25 is adapted to detect a temperature of the oil held in the oil pan (not shown). Based on the oil temperature detected by the oil temperature sensor 25, viscosity of the oil and an oil feeding amount to the planetary gear unit 4 from the splash lubrication device 20, the MOP 18 and the EOP 21 may be estimated.

Further, a speed sensor 26 is arranged in the vehicle Ve to detect speeds of the first motor 2 and the second motor 3. A detection value of the speed sensor 26 is used together with current values supplied to the first motor 2 and the second motor 3 to calculate output torques of the first motor 2 and the second motor 3.

In order to control the engine 1, the first motor 2, the second motor 3, and the pump motor 22, the vehicle Ve is further provided with an electronic control unit (to be abbreviated as the "ECU" hereinafter) 27 as the claimed controller. The ECU 27 is composed mainly of a microcomputer configured to carry out a calculation based on incident data from the vehicle speed sensor 24, the oil temperature sensor 25, the speed sensor 26 and preinstalled data, and to transmit a calculation result in the form of command signal.

Operating mode of the hybrid vehicle Ve is selected in an optimally fuel or energy efficient manner. Specifically, the operating mode of the vehicle Ve is selected from HV mode where the vehicle Ve is powered at least by the engine 1, and EV mode where the vehicle Ve is powered by at least one of the motors 2 and 3 while stopping the engine 1 depending on a running condition.

The EV mode can be selected depending on a running condition from single-motor mode as the first EV mode where the vehicle Ve is powered only by the second motor 3, and dual-motor mode as the second EV mode where the vehicle Ve is powered by both of the first motor 2 and the second motor 3.

Under the single-motor mode, the second motor 3 is operated as a motor to generate torque by rotating in a forward direction (i.e., a rotational direction of the output shaft 1a of the engine 1) so that the vehicle Ve is propelled by the second motor 3.

Under the dual-motor mode, the vehicle Ve is powered by both of the first motor 2 and the second motor 3. In this case, the first motor 2 is rotated in a counter direction (opposite to the rotational direction of the output shaft 1a of the engine 1) to generate torque, while the second motor 3 is rotated in the forward direction (i.e., in the rotational direction of the output shaft 1a of the engine 1) to generate torque. In this situation, torque in the counter direction is applied to the carrier 8 and the input shaft 4a so that the one-way clutch 10 is brought into engagement. Consequently, the vehicle Ve is allowed to be propelled efficiently by the motors 2 and 3 while stopping a rotation of the engine 1.

Thus, the operating mode of the vehicle Ve is switched between the HV mode and the EV mode depending on a running condition and a demanded driving force. As stated above, under the EV mode, the engine 1 is stopped and hence the MOP 18 is not allowed to generate hydraulic pressure. However, under the single-motor mode, the oil is required to lubricate and cool the second motor 3. In addition, under the dual-motor mode, the oil is required to lubricate and cool the pinion gears 9 and pinion shafts 9a of the planetary gear unit 4. Under the dual-motor mode, specifically, the first motor 2 and the second motor 3 are rotated in opposite directions while bringing the one-way clutch 10 into engagement to halt rotations of the carrier 8 and the output shaft 1a. That is, in the planetary gear unit 4, the sun gear 6 and the ring gear 7 are rotated in opposite directions while halting rotation of the carrier 8, and the pinion gears 9 are rotated while being inhibited to revolve around the sun gear 6. In this situation, a rotational speed of each pinion gear 9 is governed by a speed difference between the sun gear 6 and the ring gear 7. However, since the sun gear 6 and the ring gear 7 are thus rotated in the opposite directions, the pinion gears 9 are rotated at a high speed. For this reason, under the dual-motor mode, it is necessary to deliver the oil sufficiently to the planetary gear unit 4 to prevent seizure and to reduce frictions of the pinion gears 9 and the pinion shafts 9a.

Given that the vehicle Ve is a Plug in Hybrid Vehicle (abbreviated as "PHV") in which a battery for propelling the vehicle can be charged by an external electric power source, the single-motor mode would be selected more frequently in comparison with the conventional hybrid vehicle. Under the single-motor mode, rotational speeds of the pinion gears 9 will not be raised excessively unlike the dual-motor mode. However, temperatures of the second motor 3, the planetary gear unit 4, the gear train and so on are raised with duration of the single-motor mode. For this reason, the EOP 21 may also be needed to be driven even in the single-motor mode.

Thus, the EOP 21 is driven by activating the pump motor 22 to deliver the oil to the planetary gear unit 4 when the EV mode is selected or when the engine 1 is stopped.

Figure 2:
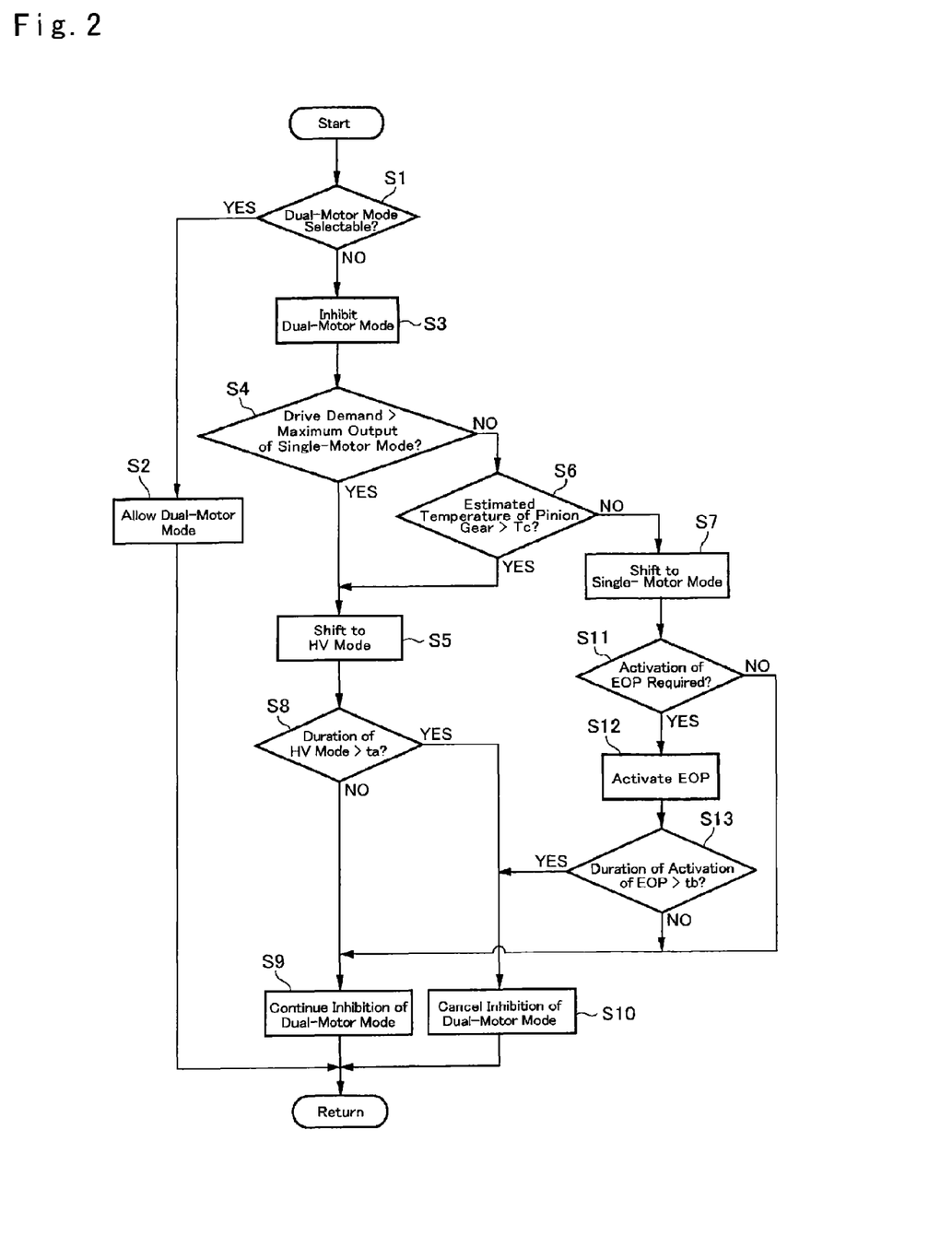
FIG. 2 is a flowchart showing one example of the control carried out by the control system according to the preferred example.

In order to prevent seizure and wear of the pinion gears 9 of the planetary gear unit 4 under the dual-motor mode while expanding an operating region where the dual-motor mode is selectable to ensure high motor power, the ECU 27 carries out the following control shown in FIG. 2.

The control example shown in FIG. 2 is executed when the dual-motor mode is demanded or during propulsion of the vehicle Ve under the dual-motor mode.

At step S1, an availability of the dual-motor mode is determined based on a detected temperature of the oil delivered to the planetary gear unit 4 or an estimated temperature of the planetary gear unit 4. For example, if the oil temperature or the temperature of the planetary gear unit 4 is higher than a predetermined upper limit, seizure of the planetary gear unit 4 may occur and hence the operating mode will not be shifted to the dual-motor mode.

The availability of the dual-motor mode may also be determined based on an estimated value of a feeding amount of the oil to the planetary gear unit 4. To this end, the feeding amount of the oil to the planetary gear unit 4 may be estimated based on detection data of the oil temperature sensor 25. That is, if the oil temperature drops, viscosity of the oil is increased and hence fluidity of the oil is worsened. Accordingly, if the oil temperature is lower than a predetermined level, the oil feeding amount to the planetary gear unit 4 may be decreased to be less than a predetermined required value. In this case, the operating mode is also not shifted to the dual-motor mode.

The oil feeding amount to the planetary gear unit 4 may also be estimated based on detection data of the vehicle speed sensor 24 and the oil temperature sensor 25. As described, the oil feeding amount to the planetary gear unit 4 from the splash lubrication device 20 is decreased at a high speed and at a low speed. Accordingly, if the vehicle speed is out of a predetermined speed range, the oil feeding amount to the planetary gear unit 4 may be decreased to be less than the predetermined required value. In this case, the operating mode is also not shifted to the dual-motor mode.

The availability of the dual-motor mode may also be determined based on an operability of the EOP 21. To this end, an operability of the EOP 21 may be determined based on detection data of the oil temperature sensor 25. For example, if the oil temperature is low and hence viscosity of the oil is high, the EOP 21 may not be operated properly due to shortage of power. Thus, if the oil temperature is lower than the predetermined level, the EOP 21 may not be operated properly and hence the operating mode is also not shifted to the dual-motor mode.

In addition, if some sort of failure occurs on the EOP 21, EOP 21 may not be operated properly. In this case, therefore, the operating mode is also not shifted to the dual-motor mode.

If the dual-motor mode is available so that the answer of step S1 is YES, the dual motor mode is permitted at steep S2. At step S2, specifically, an inhibition flag of the dual-motor mode is turned off, and then the routine is returned without carrying out any specific control.

By contrast, if the dual-motor mode is not available so that the answer of step S1 is NO, the inhibition flag of the dual-motor mode is turned on at step S3 to inhibit the dual-motor mode.

Then, at step S4, it is determined whether or not a required driving force is larger than a maximum driving force that can be generated under the single-motor mode only by the second motor 3. To this end, the required driving force may be calculated based on an opening degree of an accelerator.

If the required driving force is larger than the maximum possible driving force under the single-motor mode so that the answer of step S4 is YES, the routine advances to step S5 to shift the operating mode to the HV mode. Specifically, the engine 1 is started to power the vehicle Ve by the engine 1 and the second motor 3. In this case, if the vehicle Ve has already been propelled under the HV mode, the operating mode is not shifted and the HV mode is continued.

By contrast, if the required driving force is smaller than the maximum possible driving force under the single-motor mode so that the answer of step S4 is NO, the routine advances to step S6 to determine whether or not estimated temperatures of the pinion gears 9, the pinion shafts 9a, bearings and so on are higher than a predetermined threshold temperature Tc.

To this end, specifically, temperatures of the pinion gears 9, the pinion shafts 9a, bearings etc. may be estimated based on a rotational speed of the pinion gear 9 and a temperature of the oil delivered to the planetary gear unit 4. In this case, optionally, the temperatures of the pinion gears 9, the pinion shafts 9a, bearings etc. may be estimated taking account of a load applied to the planetary gear unit 4, in other words, taking account of output torques of the first motor 2 and the second motor 3. Alternatively, the temperatures of the pinion gears 9, the pinion shafts 9a, bearings etc. may also be estimated based on detection data of a temperature sensor connected to the planetary gear unit 4.

The threshold temperature Tc is set to be lower than a temperature at which seizure of pinion gears 9 occurs and hence the pinion gears 9 need to be cooled compulsory. When the estimated temperatures of the pinion gears 9, the pinion shafts 9a, bearings etc. exceed the threshold temperature Tc, therefore, the oil is delivered to the planetary gear unit 4 from the MOP 18.

Specifically, if the estimated temperatures of the pinion gears 9, the pinion shafts 9a, bearings etc. are higher than the threshold temperature Tc so that the answer of step S6 is YES, the routine advances to the aforementioned step S5 to shift the operating mode to the HV mode even if the required driving force can be achieved only by the second motor 3 so as to cool the pinion gears 9 compulsory. In this case, if the vehicle Ve has already been propelled under the HV mode, the operating mode is also not shifted and the HV mode is continued.

Consequently, the MOP 18 is driven by the output power of the engine 1 so that the pinion gears 9 can be cooled and lubricated by the oil delivered from the MOP 18. As described, a discharging amount of the MOP 18 is larger than those of the splash lubrication device 20 and the EOP 21 and hence the pinion gears 9 can be cooled and lubricated efficiently.

By contrast, if the estimated temperatures of the pinion gears 9, the pinion shafts 9a, bearings etc. are lower than the threshold temperature Tc so that the answer of step S6 is NO, the routine advances to step S7 to shift the operating mode to the single-motor mode in which the vehicle Ve is powered only by the second motor 3.

After inhibiting the dual-motor mode and consequently the operating mode of the vehicle Ve has been shifted to the HV mode or the single-motor mode, such inhibition of the dual-motor mode is cancelled upon satisfaction of a predetermined condition. Specifically, in case the operating mode has been shifted to the HV mode at step S5, it is determined at step S8 whether or not duration of the HV mode is longer than a first threshold period ta. To this end, the first threshold period ta is set to a required period of time to lower temperatures of the pinion gears 9 to be sufficiently lower than the threshold temperature Tc by the oil delivered thereto from the MOP 18, from the commencement of the HV mode.

If the duration of the HV mode has not yet reached the first threshold period ta so that the answer of step S8 is NO, the routine advances to step S9 to continue the inhibition of the dual-motor mode. Specifically, the inhibition flag of the dual-motor mode is maintained to be turned on to continuously cooling the pinion gears 9 compulsory by the oil delivered from the MOP 18 under the HV mode. Then, the routine is returned.

By contrast, if the duration of the HV mode has reached the first threshold period ta so that the answer of step S8 is YES, the routine advances to step S10 to cancel the inhibition of the dual-motor mode. Specifically, the inhibition flag of the dual-motor mode is turned off to allow selection of the dual-motor mode according to need. Then, the routine is returned.

In case the operating mode has been shifted to the single-motor mode at step S7, it is determined at step S11 whether or not activation of the EOP 21 is required. During propulsion under the single-motor mode, the engine 1 is stopped and hence the MOP is stopped. In this situation, the oil is delivered to the planetary gar unit 4 and the second motor 3 from the splash lubrication device 20. As described, the oil may not be applied sufficiently to the planetary gar unit 4 and the second motor 3 if the vehicle speed is out of the aforementioned speed range or the vehicle Ve has been propelled under the single-motor mode for long periods of time. In this case, therefore, the EOP 21 is activated to deliver the oil to the planetary gar unit 4 and the second motor 3.

If activation of the EOP 21 is not required so that the answer of step S11 is NO, the routine also advances to step S9 to continue the inhibition of the dual-motor mode. Specifically, the inhibition flag of the dual-motor mode is maintained to be turned on to continue propulsion under the single-motor mode. Then, the routine is returned.

By contrast, if activation of the EOP 21 is required so that the answer of step S11 is YES, the routine advances to step S12 to activate the EOP 21 by driving the pump motor 22.

Then, it is determined at step S13 whether or not duration of activation of the EOP 21 is longer than a second threshold period tb. To this end, the second threshold period tb is set to a required period of time to lower temperatures of the pinion gears 9 to be sufficiently lower than the threshold temperature Tc by the oil delivered thereto from the EOP 18, from the commencement of activation of the EOP 21.

If the duration of activation of the EOP 21 has not yet reached the second threshold period tb so that the answer of step S13 is NO, the routine also advances to step S9 to continue the inhibition of the dual-motor mode. Specifically, the inhibition flag of the dual-motor mode is maintained to be turned on to continue propulsion under the single-motor mode and activation of the EOP 21. Then, the routine is returned.

By contrast, if the duration of activation of the EOP 21 has reached the second threshold period tb so that the answer of step S13 is YES, the routine also advances to step S10 to cancel the inhibition of the dual-motor mode. In this case, the planetary gear unit 4 and the second motor 3 have already been cooled sufficiently, and the inhibition flag of the dual-motor mode is turned off to allow selection of the dual-motor mode according to need. Then, the routine is returned.

Figure 3:
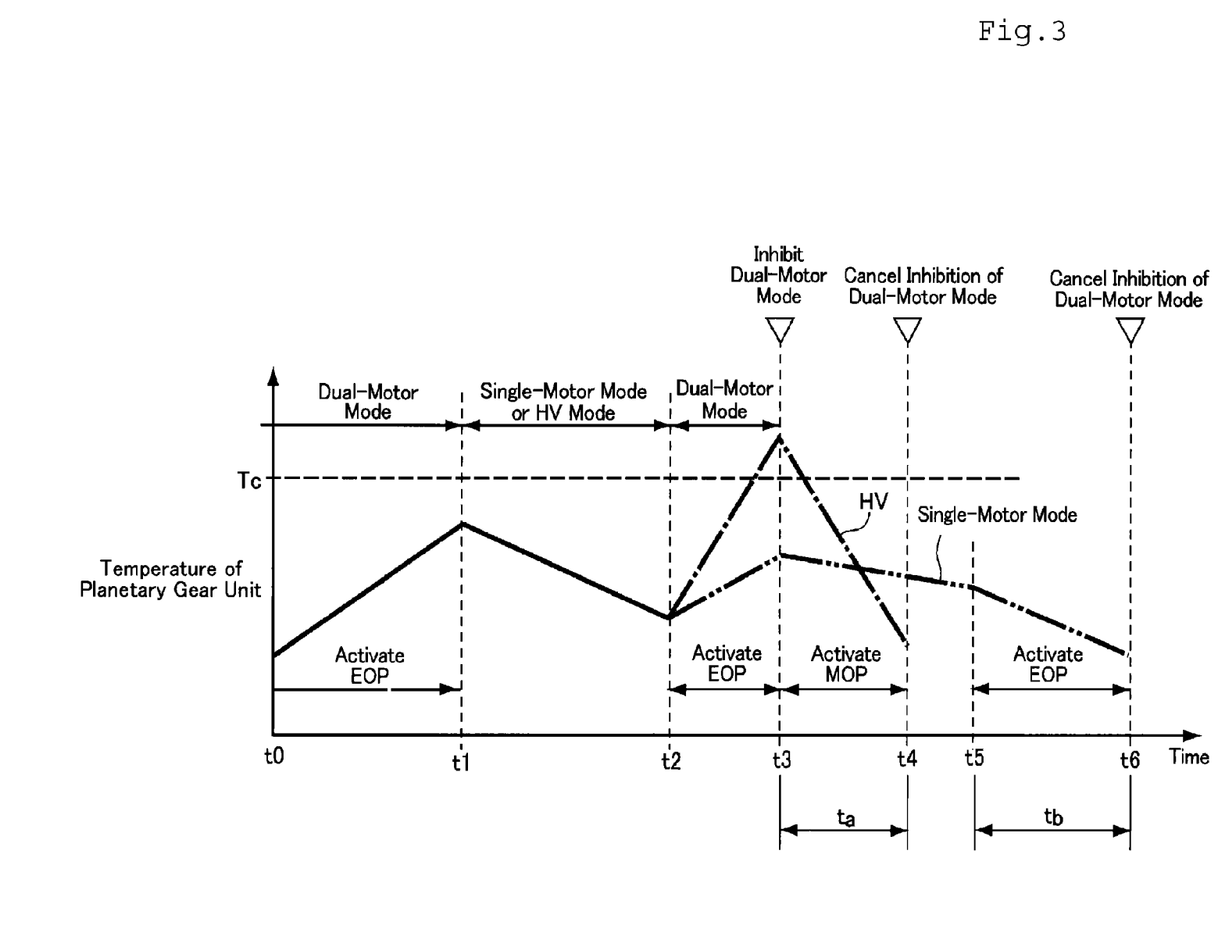
FIG. 3 is a time chart showing a temporal change in a temperature of the planetary gear unit during execution of the control shown in FIG. 2.

Turning to FIG. 3, there is shown a change in temperature of the planetary gear unit 4 during execution of the control shown in FIG. 2. In the time chart shown in FIG. 3, the vehicle is propelled under the dual-motor mode from point t0 to point t1. In this situation, the EOP 21 is activated to deliver the oil to the planetary gear unit 4. However, the pinion gears 9 are subjected to significant loads resulting from driving the first motor 2, and hence temperature of the planetary gear unit 4 is being raised. Then, the operating mode is shifted from the dual-motor mode to the single-motor mode or the HV mode at point t1 so that the temperature of the planetary gear unit 4 is lowered.

After point t2, the operating mode is shifted again to the dual-motor mode, and then the dual-motor mode is inhibited at point t3. For example, at point t3, the dual-motor mode is inhibited upon exceedance of the threshold temperature Tc of the temperatures of the pinion gears 9, or upon occurrence of failure on the EOP 21.

When the dual-motor mode is thus inhibited, the operating mode of the vehicle Ve is shifted depending on the estimated temperatures of the pinion gears 9, the pinion shafts 9a, bearings and etc. For example, if any of the aforementioned estimated temperature is higher than the threshold temperature Tc as indicated by a dashed-dotted line in FIG. 3, the operating mode is shifted from the dual-motor mode to the HV mode.

As a result of thus shifting the operating mode to the HV mode, the MOP 18 is driven by the engine 1 so that the temperature of the planetary gear unit 4 is lowered. Then, when the duration of the HV mode reaches the first threshold period to at point t4, inhibition of the dual-motor mode is cancelled to allow selection of the dual-motor mode.

By contrast, if the estimated temperature of the planetary gear unit 4 is lower than the threshold temperature Tc as indicated by a dashed-two dotted line in FIG. 3, the operating mode is shifted from the dual-motor mode to the single-motor mode.

After thus shifting the operating mode to the single-motor mode, the first motor 2 is stopped and hence the load on the planetary gear unit 4 is lightened and temperature rise in the planetary gear unit 4 is suppressed. As a result, the temperature rise of the planetary gear unit 4 is lowered as indicated in FIG. 3. The EOP 21 is activated again at point t5 so that the temperature of the planetary gear unit 4 is further lowered. Then, when duration of activation of the EOP 21 reaches the second threshold period tb at point t6, inhibition of the dual-motor mode is cancelled to allow selection of the dual-motor mode.

Thus, in the vehicle Ve shown in FIG. 1, the EOP 21 is employed as an alternative hydraulic source used when the MOP 18 cannot be driven by the engine 1. Alternatively, oil pumps shown in FIGS. 4 and 5 may also be used instead of the EOP 21.

According to the embodiment shown in FIG. 4, a conventional mechanical oil pump (to be abbreviated as the "MOP" hereinafter) 28 is employed instead of the EOP 21. Specifically, a rotor (not shown) of the MOP 28 is rotated by torque delivered from the drive shaft 5 to generate hydraulic pressure. The oil discharged from the MOP 28 is delivered to the planetary gear unit 4 through an oil passage 29. That is, the MOP 28 can be driven to discharge the oil for lubricating the planetary gear unit 4 as long as the driveshaft 5 is rotated during propulsion of the vehicle Ve. According the embodiment shown in FIG. 4, the oil passage 29 is formed independently to provide a connection between the MOP 28 and the planetary gear unit 4. However, the oil passage 29 may be joined partially to the oil passage 19.

Figure 4:
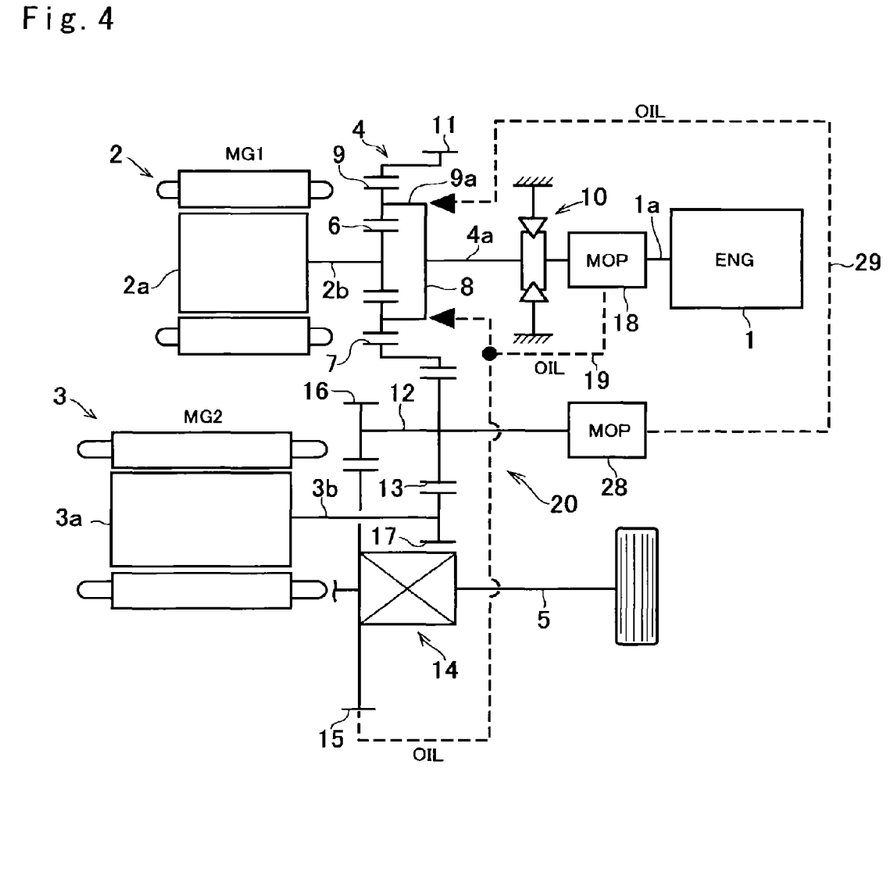
FIG. 4 is a schematic illustration showing another example of the hybrid vehicle to which the control system according to the preferred example is applied.

According to the embodiment shown in FIG. 4, therefore, an oil feeding amount from the MOP 28 to the pinion gears 9 is increased with an increase in the vehicle speed and hence the pinion gears 9 may be cooled and lubricated even at high speed.

According to the embodiment shown in FIG. 5, a conventional mechanical oil pump (to be abbreviated as the "MOP" hereinafter) 30 is also employed instead of the EOP 21. Specifically, a rotor (not shown) of the MOP 30 is connected to the rotor shaft 2b of the first motor 2 to be rotated by the torque of the first motor 2 to generate hydraulic pressure. The oil discharged from the MOP 30 is delivered to the planetary gear unit 4 through an oil passage 31. That is, the MOP 30 can be driven to discharge the oil for lubricating the planetary gear unit 4 as long as the first motor 1 is rotated even if the output shaft 1a of the engine 1 is not rotated.

Figure 5:
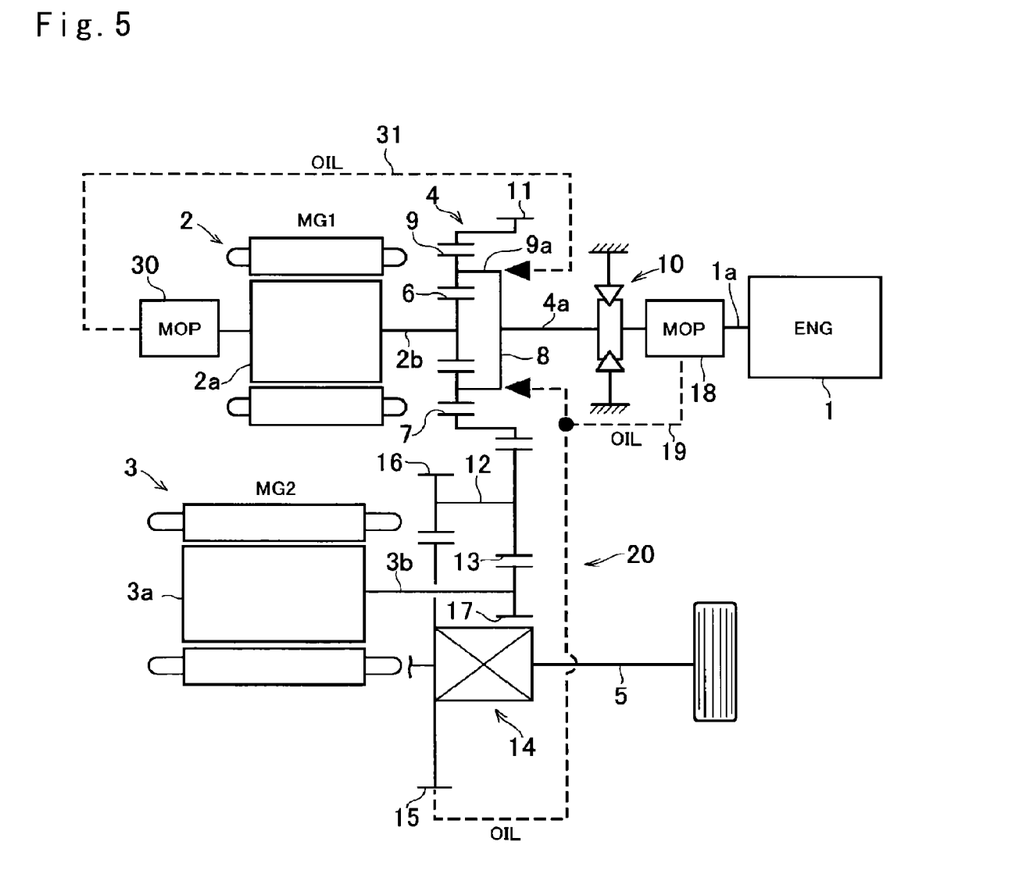
FIG. 5 is a schematic illustration showing still another example of the hybrid vehicle to which the control system according to the preferred example is applied.

According to the embodiment shown in FIG. 5, therefore, the oil can be discharged from the MOP 28 as long as the first motor 1 is rotated and hence the pinion gears 9 may be cooled and lubricated even under the dual motor mode.

What is claimed is:

1. A control system for a hybrid vehicle, comprising:
    a prime mover including an engine, a first motor, and a second motor;
    a planetary gear unit, in which a sun gear is connected to the first motor, a ring gear is connected to the second motor, and a carrier is connected to the engine, in which a driveshaft is connected to the sun gear or the ring gear, and in which a rotation of the carrier is selectively halted by a brake; and
    a mechanical oil pump that is driven by the engine to deliver oil to the planetary gear unit;
    wherein an operating mode of the hybrid vehicle is selected from a hybrid mode in which the hybrid vehicle is powered at least by the engine, a first electric vehicle mode in which the hybrid vehicle is powered by the second motor, and a second electric vehicle mode in which the hybrid vehicle is powered by the first motor and the second motor while halting rotation of the carrier by the brake; and
    wherein the control system comprising a controller that is configured:
    to estimate a temperature of a pinion gear of the planetary gear unit;
    to determine an availability of the second electric vehicle mode;
    to inhibit the second electric vehicle mode if the second electric vehicle mode is unavailable; and
    to shift the operating mode to the hybrid mode if the estimated temperature of the pinion gear is higher than a threshold temperature, and to the first electric vehicle mode if the estimated temperature of the pinion gear is lower than a threshold temperature.

2. The control system for a hybrid vehicle as claimed in claim 1, further comprising:
    an oil feeding device that is driven by a power other than engine power to deliver the oil to the planetary gear unit; and
    wherein the controller is further configured
    to estimate an oil feeding amount to the planetary gear unit from the oil feeding device, and to determine a fact that the second electric vehicle mode is unavailable if the estimated oil feeding amount is smaller than a predetermined amount.

3. The control system for a hybrid vehicle as claimed in claim 1, further comprising:
   an oil feeding device that is driven by a power other than engine power to deliver the oil to the planetary gear unit; and
   wherein the oil feeding device includes an electric oil pump that is driven by another motor other than the prime mover to deliver oil to the planetary gear unit; and
   wherein the controller is further configured
   to determine an operability of the electric oil pump, and
   to determine a fact that the second electric vehicle mode is unavailable if the electric oil pump cannot be operated properly.

4. The control system for a hybrid vehicle as claimed in claim 1, wherein the controller is further configured to cancel inhibition of the second electric vehicle mode when duration of the hybrid mode exceed a first threshold period.

5. The control system for a hybrid vehicle as claimed in claim 1, further comprising:
   an oil feeding device that is driven by a power other than engine power to deliver the oil to the planetary gear unit; and
   wherein the oil feeding device includes an electric oil pump that is driven by another motor other than the prime mover to deliver oil to the planetary gear unit;
   wherein the controller is further configured to cancel inhibition of the second electric vehicle mode when duration of activation of the electric oil pump reaches a second threshold period.

* * * * *